(12) United States Patent
Kim et al.

(10) Patent No.: US 7,105,250 B2
(45) Date of Patent: Sep. 12, 2006

(54) NONAQUEOUS ELECTROLYTIC SOLUTION WITH IMPROVED SAFETY AND LITHIUM BATTERY EMPLOYING THE SAME

(75) Inventors: Jun-Ho Kim, Asan (KR); Ha-Young Lee, Cheonan (KR); Sang-Hoon Choy, Daejeon (KR); Ho-Sung Kim, Suwon (KR)

(73) Assignee: Samsung SDI Co., Ltd., Suwon-si (KR)

( * ) Notice: Subject to any disclaimer, the term of this patent is extended or adjusted under 35 U.S.C. 154(b) by 389 days.

(21) Appl. No.: 10/637,554

(22) Filed: Aug. 11, 2003

(65) Prior Publication Data

US 2004/0029018 A1 Feb. 12, 2004

(30) Foreign Application Priority Data

Aug. 12, 2002 (KR) ............... 10-2002-0047510

(51) Int. Cl.
*H01M 6/04* (2006.01)
(52) U.S. Cl. ............... 429/199; 429/200; 429/326; 429/327; 429/336; 252/62.2
(58) Field of Classification Search ............... 429/326, 429/327, 336, 199, 200; 252/62.2
See application file for complete search history.

(56) References Cited

U.S. PATENT DOCUMENTS

| 5,709,968 | A | * | 1/1998 | Shimizu | 429/324 |
| 5,879,834 | A | | 3/1999 | Mao | |
| 6,146,790 | A | * | 11/2000 | Omaru et al. | 252/62.2 |
| 2002/0110735 | A1 | * | 8/2002 | Farnham et al. | 429/199 |
| 2003/0190529 | A1 | * | 10/2003 | Kim et al. | 429/326 |

FOREIGN PATENT DOCUMENTS

JP  2003-217653  *  7/2003

* cited by examiner

*Primary Examiner*—Laura Weiner
(74) *Attorney, Agent, or Firm*—Stein, McEwen & Bui, LLP

(57) ABSTRACT

A nonaqueous electrolytic solution and a lithium battery employing the same include a lithium salt, an organic solvent, and a halogenated benzene compound. The use of the nonaqueous electrolytic solution causes formation of a polymer by oxidative decomposition of the electrolytic solution even if a sharp voltage increase occurs due to overcharging of the battery, leading to consumption of an overcharge current, thus protecting the battery.

18 Claims, 3 Drawing Sheets

NONAQUEOUS ELECTROLYTIC SOLUTION WITH IMPROVED SAFETY AND LITHIUM BATTERY EMPLOYING THE SAME

CROSS-REFERENCE TO RELATED APPLICATIONS

This application claims the benefit of Korean Application No. 2002-47510, filed Aug. 12, 2002, in the Korean Intellectual Property Office, the disclosure of which is incorporated herein by reference.

BACKGROUND OF THE INVENTION

1. Field of the Invention

The present invention relates to a nonaqueous electrolytic solution with improved safety and a lithium battery employing the same, and more particularly, to a nonaqueous electrolytic solution with improved safety when the battery is overcharged, and a lithium battery employing the polymer electrolyte.

2. Description of the Related Art

A lithium battery includes a cathode, an anode and an electrolytic solution providing a movement path of lithium ions between the cathode and the anode, and generates electric energy by oxidation and reduction when the lithium ions are intercalated into/deintercalated from the cathode and anode.

When a battery is overcharged due to, for example, malfunction of a charger, resulting in a rapid increase in voltage, excessive lithium is extracted from the cathode with a corresponding excessive insertion of lithium at the anode, thermally destabilizing both the cathode and the anodes. As a result, an organic solvent contained in the electrolytic solution is decomposed and a rapid exothermic reaction occurs, leading to thermal runaway, which severely impairs safety of the battery.

To overcome these problems, a method of adding additives to the electrolytic solution has been proposed.

For example, U.S. Pat. No. 5,709,968 discloses that thermal runaway occurring due to overcharge current is prevented by adding a benzene compound such as p-chloroanisole to an electrolytic solution. U.S. Pat. No. 5,879,834 discloses that aromatic additives such as biphenyl, 3-chlorothiophene, and furan are added to an electrolytic solution, and such additives are electrochemically polymerized at abnormally high voltages, thus increasing the internal resistance of a battery and protecting the battery.

However, according to the above-described methods, compounds added as additives may be electrochemically polymerized at normal operating conditions of a battery or generate a large amount of gas due to oxidative decomposition, so that swelling of the battery may increase, and battery performance such as a high-rate characteristic or a life characteristic may be decreased, making it difficult to put the batteries manufactured by the methods into practice.

SUMMARY OF THE INVENTION

The present invention provides a nonaqueous electrolytic solution having an effective high-rate characteristic, a long life characteristic, and having secured safety and an increased swelling suppressing effect even when a battery is overcharged, so that a voltage sharply increases to greater than a full charge voltage, and a lithium battery using the nonaqueous electrolytic solution.

Additional aspects and advantages of the invention will be set forth in part in the description which follows and, in part, will be obvious from the description, or may be learned by practice of the invention.

In an aspect of the present invention, a nonaqueous electrolytic solution includes a lithium salt, an organic solvent, and a halogenated benzene compound represented by Formula 1:

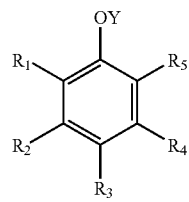

Formula 1 wherein Y is a C1 to C20 halogenated alkyl group, and $R_1$, $R_2$, $R_3$, $R_4$ and $R_5$ are independently a hydrogen or halogen atom.

According to another aspect of the present invention, a lithium battery includes a cathode, an anode, and the nonaqueous electrolytic solution.

According to another aspect of the present invention, a lithium battery includes a cathode, an anode and a nonaqueous electrolytic solution comprising a lithium salt comprising $LiPF_6$, an organic solvent comprising ethylene carbonate/ethylmethyl carbonate/propylene carbonate/fluorobenzene mixed solvent mixed in a predetermined weight ratio; and a halogenated benzene compound represented by Formula 2:

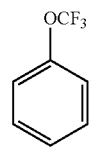

Formula 2

According to another aspect of the present invention, a lithium battery includes a cathode, an anode and a nonaqueous electrolytic solution comprising a lithium salt comprising $LiPF_6$, an organic solvent comprising ethylene carbonate/ethylmethyl carbonate/propylene carbonate/fluorobenzene mixed solvent mixed in a predetermined weight ratio; and a halogenated benzene compound represented by Formula 3:

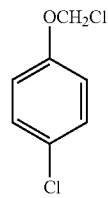

Formula 3

According to another aspect of the present invention, a lithium battery includes a cathode, an anode and a nonaqueous electrolytic solution comprising a lithium salt comprising $LiPF_6$, an organic solvent comprising ethylene carbonate/ethylmethyl carbonate/propylene carbonate/fluorobenzene mixed solvent mixed in a predetermined weight ratio; and a polyester hexaacrylate compound having two hydroxy groups present at terminals of a pentaerythritol derivative substituted by $-OC(=O)(CH_2)_5OC(=O)CH=CH_2$ and a remaining four hydroxy groups substituted by $-OC(=O)(CH_2)_3CH_3$.

BRIEF DESCRIPTION OF THE DRAWINGS

These and other/or aspects and advantages of the invention will become apparent and more readily appreciated from the following description of the embodiments, taken in conjunction with the accompanying drawing of which.

DETAILED DESCRIPTION OF THE PREFERRED EMBODIMENTS

Figure 1:
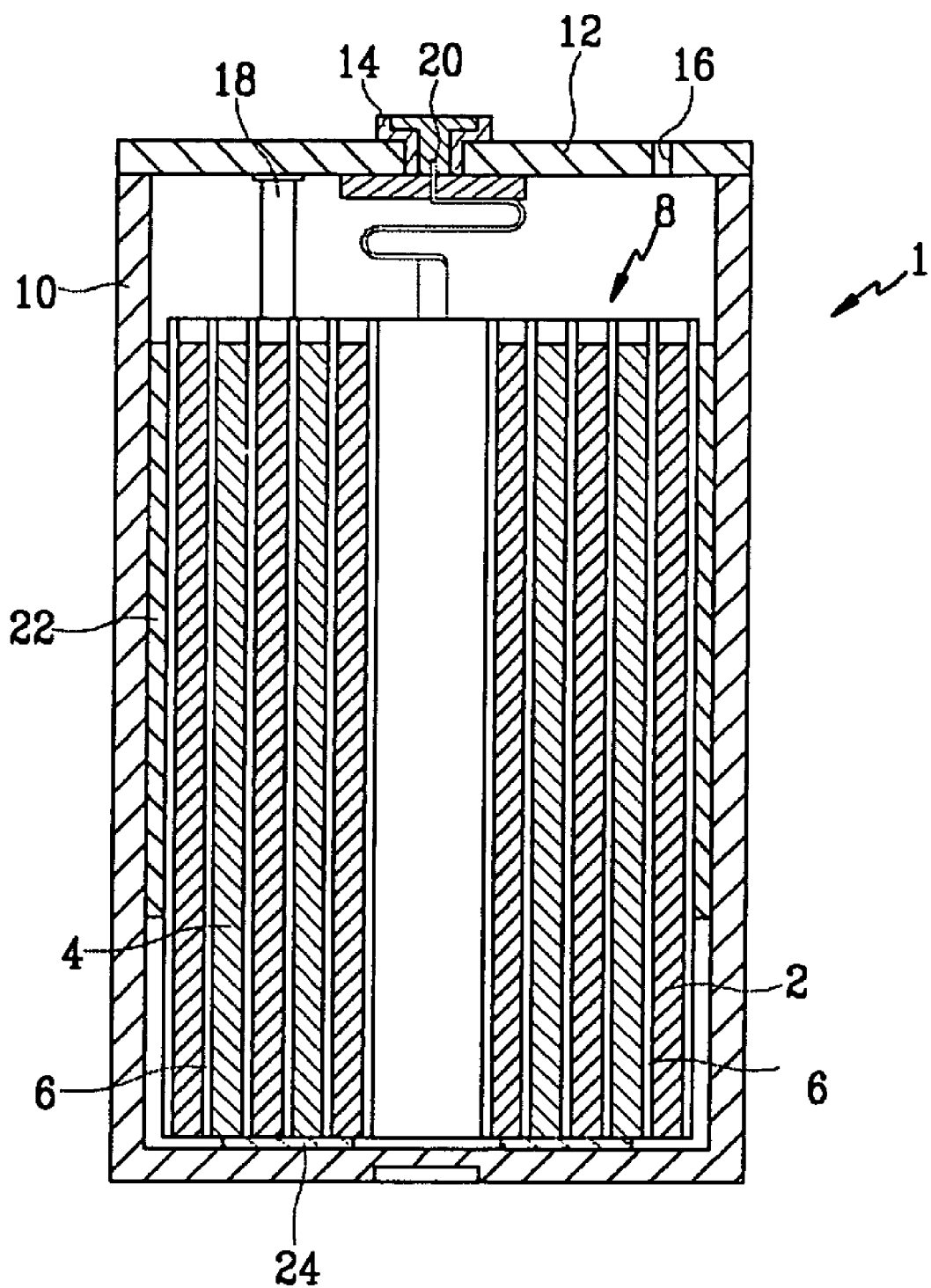
FIG. 1 is a cross-sectional view of a rectangular lithium secondary battery.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

A nonaqueous electrolytic solution according to the present invention further comprises a halogenated benzene compound represented by Formula 1, thus having improved safety:

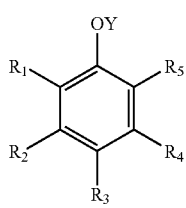

Formula 1 wherein Y is a C1 to C20 halogenated alkyl group, and R1, R2, R3, R4 and R5 are independently a hydrogen or halogen atom.

In Formula 1, Y is selected from the group consisting of $-CF_3$, $-CH_2Cl$, $-CH_2F$, $-C_2F_5$, $-CCl_3$ and $-C_2Cl_5$.

In an embodiment of the halogenated benzene compound represented by Formula 1, Y may be $-CF_3$, and $R_1$, $R_2$, $R_3$, $R_4$ and $R_5$ may each be a hydrogen atom, as represented by Formula 2:

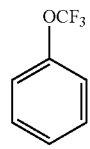

Formula 2

Alternatively, in another embodiment, in the halogenated benzene compound represented by Formula 1, Y may be $-CH_2Cl$, and $R_1$, $R_2$, $R_4$ and $R_5$ may each be a hydrogen atom, and $R_3$ may be Cl, as represented by Formula 3:

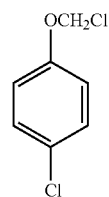

Formula 3

The content of the halogenated benzene compound represented by Formula 1 is preferably in the range of 0.1 to 50 parts by weight per 100 parts by weight of the organic solvent. If the content of the halogenated benzene compound represented by Formula 1 is less than 0.1 parts by weight, the effect of adding the same is negligible. If the content of the halogenated benzene compound represented by Formula 1 is greater than 50 parts by weight, the life characteristic undesirably deteriorates.

In the case of adding the halogenated benzene compound represented by Formula 1 to the nonaqueous electrolytic solution, the halogenated benzene compound is oxidized when the battery is overcharged, causing electrochemical polymerization on the surface of a cathode so that the polymerization product is coated thereon under a normal operating voltage ranging from 2.75 to 4.2 V, while not adversely affecting the battery performance. Accordingly, resistance between the cathode and the anode is increased and the polymerization coating having ionic and electric conductivity causes shunting between the cathode and the anode, consuming an overcharge current, thus protecting the battery. Since the halogenated benzene compound represented by Formula 1 is very stable electrochemically and thermally, adding the same to an electrolytic solution prevents deterioration of battery performance such as the standard capacity or the life characteristic and improves the safety of the battery.

A nonaqueous electrolytic solution according to the present invention may further include polyester (meth)acrylate or its polymer. The polyester (meth)acrylate or its polymer has a polyester polyol moiety having three or more hydroxide (—OH) groups, at least one hydroxde group being substituted by a (meth)acrylic ester group and at least one hydroxide group being substituted by a radical non-reactive group. Addition of polyester (meth)acrylate or its polymer to the electrolytic solution may suppress swelling of a battery and improve life characteristics of a battery under a high temperature condition.

The polyester (meth)acrylate of an embodiment of the present invention is obtained from polyester polyol having three or more hydroxide groups. If polyester (meth)acrylate modified from polyester polyol having not greater than two hydroxide groups is used as a monomer for forming a polymer electrolyte, a physically dense, viscous electrolyte is formed, lowering the mobility of lithium ions, which adversely affects the high-rate characteristic and the lifetime characteristic of a battery. If a compound with all of the hydroxide groups of the polyester polyol being substituted by (meth)acrylic ester is used as a monomer to form a polymer electrolyte, gelation is impeded by steric hindrance so that unreacted (meth)acrylic acid or its derivative remains in a final polymer electrolyte. Here, the (meth)acrylatic acid or its derivative is used to convert hydroxide groups of polyester polyol into (meth)acrylic ester. Since the unreacted (meth)acrylic acid or its derivative remaining in the polymer electrolyte are highly reactive, such substances may cause deterioration of low-temperature, high-rate discharging and lifetime characteristics of a lithium battery.

In the present invention, some hydroxide groups of polyester polyol having three or more hydroxide groups are substituted by (meth)acrylic esters, and unsubstituted hydroxide groups are substituted by radical non-reactive groups to form a polyester (meth)acrylate or its polymer.

The polyester polyols having three or more hydroxide groups useful for preparing polyester (meth)acrylate of the invention may be synthesized by methods known to those skilled in the art and may also be a commercially available product. Examples of the polyester polyols having three or more hydroxide groups include, but are not limited to, trialkylols such as trimethylol, triethylol or tripropylol, glycerols, erythritols such as pentaerythritol or dipentaerythritol, and the like.

Some or all hydroxide groups of polyester polyol may be substituted by (meth)acrylic ester by general esterification. For example, polyester polyol and (meth)acrylic acid or its derivative (e.g., halogenated (meth)acrylic acid) (to be abbreviated as "MA") may be condensation-polymerized in the presence of a base catalyst or an acid catalyst.

In the above-noted methods, the content of MA is varied according to the mole number of hydroxy group of polyester polyol. According to an embodiment of the present invention, 0.1 to 10 moles MA is preferably used based on 1 mol hydroxy group of polyester polyol. More preferably, approximately 1 mol MA is used with respect to 1 mol hydroxy group of polyester polyol.

The performance of a polymer electrolyte may be desirably improved by adjusting terminal functional groups of compounds used to form the polymer electrolyte. The performance of a polymer electrolyte may be determined by a molar ratio of MA used when it reacts with polyester polyol to substitute a polyester polyol terminal by (meth)acrylic ester, to a compound (to be abbreviated as "RX") used when it reacts with polyester polyol to substitute a polyester polyol terminal by a radical non-reactive group. The compound is exemplified by a carbonyl compound containing an aliphatic hydrocarbon group having 1 to 20 carbon atoms, an aromatic hydrocarbon group having 5 to 20 carbon atoms, an ether group having 1 to 20 carbon atoms or an ester group having 1 to 20 carbon atoms, or a halogenated compound containing an aliphatic hydrocarbon group having 1 to 20 carbon atoms, an aromatic hydrocarbon group having 5 to 20 carbon atoms, an ether group having 1 to 20 carbon atoms or an ester group having 1 to 20 carbon atoms. The molar ratio of MA to RX is preferably in the range of 1:0.01 to 1:100, more preferably 1:0.5 to 1:3. If the RX content is less than the above range, all terminals of polyester polyol are undesirably substituted by (meth)acrylic ester groups. If the content of RX exceeds the above range, reacting (meth)acrylic ester groups are too small to form a desired polymer electrolyte.

Usable basic catalysts for use in esterification of polyester polyol according to an embodiment of the present invention include organic salts such as triethylamine, pyridine or dimethylaminepyridine, and inorganic salts such as lithium carbonate, potassium carbonate, lithium hydroxide or sodium hydroxide. Here, the basic catalyst is preferably used in an amount of 0.0001 to 0.01 parts by weight based on 1 part by weight of the overall reaction solvent. Usable examples of the acid catalyst used in esterification of polyester polyol according to the present invention include sulfuric acid, hydrochloric acid, phosphoric acid, and nitric acid, and the amount used is the same as the amount of the basic catalyst.

The molecular structure of polyester polyol used in esterification may be modified by ring-opening polymerization with a lactone compound. The modified structure of the polyester polyol polymerized with a lactone compound may adjust the length of an alkyl group with a hydroxy group functioning as a reacting group in the molecular backbone, thus effectively changing the physical properties of a polymer electrolyte.

Examples of the lactone compound include ε-caprolactone and γ-caprolactone, and may be used in an amount of any molar ratio with respect to the mole number of hydroxy groups of polyester polyol. However, in view of the solubility and the molecule size of lactone substituted polyester polyol, the lactone compound is preferably used in an amount of less than or equal to 10 mol, specifically 0.01 to 10 moles, based on 1 mol of the hydroxide group of the polyester polyol.

Usable catalysts for promoting the ring-opening polymerization include organic titan compounds, organic tin compounds and organic carboxylic acid metal salts of various metals. An example of the organic titan compounds is tetrapropyl titanate.

The catalyst is preferably in an amount of 0.001 to 0.5 parts by weight based on 1 part by weight of the lactone compound. If the content of the catalyst is not in the above range, the deviation undesirably gives rise to poor reactivity of open-ring polymerization.

The ring-opening polymerization can be carried out in the absence or presence of an organic solvent. Usable organic solvents include aromatic compounds and saturated hydrocarbon compounds. The organic solvent is used in an amount of 1 to 50 parts by weight, preferably 2 to 10 parts by weight, based on 1 part by weight of polyester polyol.

The (meth)acrylic ester group substituted to the polyester polyol is particularly represented by the general formula $—OC(=O)R_nOC(=O)CH=CH_2$, $—OC(=O)R_nOC(=O)C(CH_3)=CH_2$, or $—OC(=O)R_nCH=CH_2$ (n is an integer in the range of 1 to 20).

Examples of the radical non-reactive group is represented by the general formula $—OC(=O)R'_n$, $—OC(=O)R_mOR'_n$, $—O(C=O)R_mOC(=O)R'_n$ (Here, m and n are independently an integer in the range 1 to 20, R is a (halogenated) alkylene group, a (halogenated)arylene group, a (halogenated)alkylarylene group or a (halogenated)aralkylene group, and R' is a (halogenated)alkyl group, a (halogenated) aryl group, a (halogenated)alkylaryl group or a (halogenated)aralkyl group. Note that, as used herein, "(halogenated)" refers to optional halogenation of the group or compound recited.

The molar ratio of the (meth)acrylic ester group to the group free of radical reactivity is preferably 1:0.01 to 1:100, more preferably 1:0.5 to 1:3.

The substituted polyester (meth)acrylic ester group or its polymer preferably has a weight-average molecular weight of about 300 to 100,000.

The polyester (meth)acrylate or its polymer is preferably used in an amount of 0.1 to 10 parts by weight per 100 parts by weight of the organic solvent. If the amount of the polyester (meth)acrylate is less than 0.1 parts, the effect of adding the same is negligible. If the amount of the polyester (meth)acrylate is greater than 10 parts, the life characteristic of a battery undesirably deteriorates.

The nonaqueous electrolytic solution according to the present invention may further include organic peroxide as a polymerization initiator. The organic peroxide further promotes a swelling suppressing effect under a high temperature condition by polymerizing the polyester (meth)acrylate when the internal temperature of a battery increases. Also, a gel-type polymer electrolyte may be prepared by heating the polyester (meth)acrylate and the organic peroxide at 40 to 110° C. or subjecting to UV radiation.

The organic peroxide is divided into a polar (hydrophilic) part of —C(=O)—O—O—C(=O) and a non-polar (hydrophobic) part of an aliphatic or aromatic hydrocarbon group having 6 to 40 carbon atoms. Such peroxides serve as a surfactant between an electrolytic solution and an anode, particularly a carbonaceous anode, thus reducing resistance therebetween to suppress decomposition of the electrolytic solution at the anode surface.

Unlike in the case of using an azobenzene initiator such as 2,2'-azoisobutyronitrile producing $N_2$, which is an insoluble in an electrolytic solution, the peroxide of an embodiment of the present invention produces $CO_2$ gas, which is highly hydrophilic with respect to an electrolytic solution, thus improving initial charging/discharging efficiency of a lithium battery.

Examples of the organic peroxide include at least one selected from the group consisting of isobutyl peroxide, lauroyl peroxide, benzoyl peroxide, m-toluoyl peroxide, t-butyl peroxy-2-ethylhexanoate, t-butylperoxybivalerate, t-butyloxyneodecanate, diisopropyl peroxy dicarbonate, diethoxy peroxy dicarbonate, bis(4-t-butylcyclohexyl)peroxydicarbonate, dimethoxy isopropyl peroxy dicarbonate, dicyclohexylperoxy dicarbonate and 3,3,5-trimethylhexanoyl peroxide. The epoxide of an embodiment of the present invention is preferably lauroyl peroxide or benzoyl peroxide.

The organic peroxide is preferably used in an amount of 0.3 to 5 parts by weight per 100 parts by weight of polyester (meth)acrylate. If the amount of the organic peroxide is less than 0.3 parts, the polymerization reactivity is lowered. If the amount of the organic peroxide is greater than 5 parts, the molecular weight of the polymer is not great enough to decrease the mechanical property of the polymer electrolyte.

The nonaqueous electrolytic solution according to an embodiment of the present invention may further include a sulfone compound. Addition of the sulfone compound leads to effective suppression of swelling of a battery. Examples of the sulfone compound include at least one selected from the group consisting of methyl sulfone, vinyl sulfone, phenyl sulfone, benzyl sulfone, tetramethylene sulfone and butadiene sulfone. The amount of the sulfone compound is preferably in the range of 0.1 to 10 parts by weight per 100 parts by weight of the organic solvent. If the amount of the sulfone compound is less than 0.1 parts, the effect of adding the same is negligible. If the amount of the sulfone compound is greater than 10 parts, the capacity characteristic of the battery undesirably decreases.

The halogenated benzene compound represented by Formula 1, the polyester (meth)acrylate or its polymer, the organic peroxide and/or the sulfone compound are added to the nonaqueous organic solvent containing a lithium salt. Here, the lithium salt acts as a supply source of lithium ions to operate a lithium battery. The nonaqueous organic solvent serves as a medium for movement of ions associated with electrochemical reactions of a battery.

The lithium salt of an embodiment of the present invention is at least one selected from the group consisting of $LiPF_6$, $LiBF_4$, $LiSbF_6$, $LiAsF_6$, $LiClO_4$, $LiCF_3SO_3$, and $Li(CF_3SO_2)_2N$, $LiC_4F_9SO_3$, $LiAlO_4$, $LiAlCl_4$, $LiN(C_xF_{2x+1}SO_2)(C_yF_{2y+1}SO_2)$ (x and y are each independently a natural number.), LiCl, and LiI. The concentration of the lithium salt is preferably in the range of 0.6 to 2.0 M, more preferably 0.7 to 1.6 M. If the concentration of the lithium salt is less than 0.6 M, the ionic conductivity characteristic of the battery decreases. If the concentration of the lithium salt is greater than 2.0 M, mobility of the lithium ions is undesirably reduced.

The nonaqueous organic solvent is not particularly limited, provided that it is generally used for a lithium battery, and may include dimethyl carbonate (DMC), ethylmethyl carbonate (EMC), diethyl carbonate (DEC), dipropyl carbonate (DPC), methylpropyl carbonate (MPC), ethylpropyl carbonate (EPC), ethylene carbonate (EC), propylene carbonate (PC), butylene carbonate (BC), acetonitrile, n-methyl acetate, n-ethyl acetate, n-propyl acetate, acetone, dimethylformamide and fluorobenzene (FB).

The nonaqueous electrolytic solution according to the present invention may be used in general lithium batteries without limitation.

A method to prepare a lithium battery according to the present invention will now be described.

The lithium battery according to embodiments of the present invention may be manufactured by two methods below.

First, a halogenated benzene compound represented by Formula 1, a lithium salt and an organic solvent are mixed to obtain a nonaqueous electrolytic solution. The nonaqueous electrolytic solution may further include polyester (meth)acrylate having a polyester polyol moiety having three or more hydroxide (—OH) groups, at least one hydroxide group being substituted by (meth)acrylic ester group and at least one hydroxide group being substituted by a radical non-reactive group, an organic peroxide and/or a sulfone compound.

Separately, a cathode and an anode are fabricated in a method generally used to manufacture a lithium battery. Here, a lithium composite oxide, a transition metal compound or a sulfur compound may be used as a cathode active material, and a lithium metal, carbonaceous material or graphite may be used as an anode active material.

Then, a separator is interposed between the cathode and the anode to form an electrode assembly that is then accommodated in a battery case. The nonaqueous electrolytic solution is injected into the resultant product, thus completing a lithium battery according to an embodiment of the present invention.

The separator is made from an insulating resin having a network structure, and specific examples of the separator material include polyethylene, polypropylene and a combination thereof.

When the nonaqueous electrolytic solution according to an embodiment of the present invention further includes the polyester (meth)acrylate or its polymer and the polyester (meth)acrylate or its polymer is used as a monomer to form the polymer electrolyte, a lithium battery according to an embodiment of the present invention is manufactured in the following manner.

A halogenated benzene compound represented by Formula 1, the polyester (meth)acrylate or its polymer, a peroxide, an organic solvent and a lithium salt are mixed to obtain a nonaqueous electrolytic solution (also called a composition to form a polymer electrolyte). A sulfone compound may further be added to the nonaqueous electrolytic solution. Separately, a cathode and an anode are prepared, respectively, in the same manner as described above.

Then, a separator made from an insulating resin having a network structure is interposed between the cathode and the anode to form an electrode assembly that is then put into a battery case. Then, the nonaqueous electrolytic solution, that is, the composition to form a polymer electrolyte, is injected into the resulting battery case accommodating the electrode assembly, selectively followed by heat treatment or UV radiation to perform polymerization, thus completing a lithium battery according to an embodiment of the present invention In the above-described preparation method, the heat treatment for polymerization is performed at a temperature in the range of 40 to 110° C., preferably 60 to 85° C. If the heat treatment temperature is lower than 40° C., excess unreacted polymerizable monomers remain or a reaction time may be prolonged. If the heat treatment temperature is higher than 110° C., vigorous decomposition of the lithium salt may result. As the light for polymerization, UV or E-beam may be used.

The present invention may be applied to both lithium primary batteries and lithium secondary batteries.

FIG. 1 is a cross-sectional view of a lithium secondary battery according to an embodiment of the present invention. Referring to FIG. 1, a lithium battery 1 has a structure in which an electrode assembly 8 having a separator 6 interposed between a cathode 2 and an anode 4 is accommodated in a case 10. The upper portion of the electrode assembly 8 is sealed by a cap plate 12 and a gasket 14, and a safety vent 16 to prevent the internal pressure of the battery from increasing excessively is installed in the cap plate 12. A cathode tab 18 and an anode tab 20 are connected to the cathode 2 and the anode 4, respectively, and corresponding insulating pieces 22 and 24 may be inserted to prevent the possibility of internal shorting of the battery.

The present invention will now be described using the following examples. However, the invention is understood to not be limited thereto.

SYNTHESIS EXAMPLE 1

2.755 g of an EC/EMC/PC/FB mixed solvent mixed in a weight ratio of 30:55:5:10 containing 1.15 M $LiPF_6$, and 0.145 g of trifluoromethoxybenzene represented by Formula 2 were mixed to prepare a nonaqueous electrolytic solution.

SYNTHESIS EXAMPLE 2

A nonaqueous electrolytic solution was prepared in the same manner as in Synthesis Example 1 except that α,4-dichloranisole represented by Formula 3 was used instead of trifluoromethoxybenzene represented by Formula 2.

SYNTHESIS EXAMPLE 3

To a mixture of 1 mole of dipentaerythritol, 2 moles of ε-caprolactone and a toluene solvent were added to 100 mg of tetrapropyltitanate as a catalyst, and reacted at 50° C. to synthesize a dipentaerythritol derivative having some hydroxy terminals substituted with pentylalcohols.

Subsequently, 4 moles of acrylic acid and 2 moles of butyl carboxylic acid were reacted with 1 mole of the dipentaerythritol derivative, giving a polyester hexaacrylate compound having two hydroxy groups present at the terminals of the pentaerythritol derivative substituted by —OC(=O)$(CH_2)_5$OC(=O)CH=$CH_2$ and the remaining four hydroxy groups substituted by —OC(=O)$(CH_2)_3CH_3$.

1 g of the polyester hexaacrylate compound and 30 g of an EC/EMC/PC/FB mixed solvent mixed in a weight ratio of 30:55:5:10 containing 1.15 M $LiPF_6$, to prepare a nonaqueous electrolytic solution.

COMPARATIVE SYNTHESIS EXAMPLE

A nonaqueous electrolytic solution was prepared in the same manner as in Synthesis Example 1 except that o-terphenyl was used instead of trifluoromethoxybenzene represented by Formula 2.

EXAMPLE 1

94 g of $LiCoO_2$, 43 g of N-methylpyrrolidone (NMP), 2 g of polyvinylidenefluoride (PVDF) and 3 g of Super P conductive carbon (available from MMM CORP.) were mixed to produce a cathode active material slurry. Then, an aluminum (Al) foil was coated with the cathode active material slurry, dried, rolled using a roll press to prepare a cathode having a thickness of 0.147 mm.

94 g of MCF (available from PETCOA, LTD.), 65 g of NMP and 6 g of PVDF were mixed to produce an anode active material slurry. Then, a copper (Cu) foil was coated with the anode active material slurry, dried, rolled using a roll press to prepare an anode having a thickness of 0.178 mm.

A polyethylene separator having a thickness of 0.025 mm was interposed between the cathode and the anode. The resultant structure was accommodated in a rectangular battery case having a dimension of 30 mm×48 mm×6 mm, and then the nonaqueous electrolyte solution obtained in Synthesis Example 1 was injected into the battery case, thus manufacturing a lithium secondary battery having a capacity of approximately 950 mAh.

EXAMPLE 2

A lithium secondary battery was manufactured in the same manner as in Example 1 except that the nonaqueous electrolytic solution prepared in Synthesis Example 2 was used instead of the nonaqueous electrolytic solution prepared in Synthesis Example 1.

EXAMPLE 3

A lithium secondary battery was manufactured in the same manner as in Example 1 except that the nonaqueous electrolytic solution prepared in Synthesis Example 3 was used instead of the nonaqueous electrolytic solution prepared in Synthesis Example 1.

COMPARATIVE EXAMPLE

A lithium secondary battery was manufactured in the same manner as in Example 1 except that the nonaqueous electrolytic solution prepared in Comparative Synthesis Example was used instead of the nonaqueous electrolytic solution prepared in Synthesis Example 1.

In the lithium secondary batteries manufactured in Examples 1–3 and Comparative Example, the following characteristics were evaluated.

(1) Oxidative Decomposition Potential

Potentials ranging from 3.0 to 6.0 V were applied by a potential scanning method and an oxidation initiating potential for an electrolyte additive was determined. Pt was used for an acting electrode and a counter electrode, and metallic Li was used for a reference electrode. A scanning speed was approximately 10 mV/s.

(2) Overcharge Characteristics

A lithium secondary battery was charged to 4.2 V with a charge current of approximately 950 mA (1 C) at room temperature, and then charged at a constant voltage of 4.2 V for 3 hours until a fully charged state was reached. In the fully charged lithium secondary battery, overcharging was performed such that a charge current of approximately 950 mA (1 C) was applied between a cathode and an anode for approximately 2.5 hours. Then, to evaluate overcharging characteristics of the lithium ion battery, changes in charge voltage and temperature were observed, and the results are shown in Table 1. L0 indicates an effective state, L1 indicates leak, L2 indicates flash, L3 indicates smoke, L4 indicates fire and L5 indicates rupture.

(3) Life Characteristic

Cycle tests were made as follows: charging was performed at 1.0 C and 4.2 V cut-off, a rest time of 30 minutes was allowed at room temperature, and then discharging was performed at 1.0 C and 2.75 V cut-off. Charge and discharge cycles were repeated 300 times. The life characteristic of the battery was evaluated by determining the ratio of a discharge capacity after the first cycle to a discharge capacity after the 100th cycle.

(4) Standard Capacity

Charging was performed at 0.2 C and 4.2 V cut-off, a rest time of 30 minutes was allowed at room temperature, and then discharging was performed at 0.2 C and 2.75 V cut-off. Then, the standard capacity of the battery was evaluated by investigating capacity characteristics.

(5) High-rate Characteristic

To evaluate the high-rate characteristic of the battery, the ratio of a charge capacity to a discharge capacity was determined as follows. Charging was performed at 0.5 C and 4.2 V cut-off, a rest time of 30 minutes was allowed at room temperature, and then discharging was performed at 0.2 C and 2.75 V cut-off. Also, charging was performed at 0.5 C and 4.2 V cut-off, a rest time of 30 minutes was allowed at room temperature, and then discharging was performed at 2.0 C and 2.75 V cut-off.

(6) Swelling

Charging was performed at 0.5 C and 4.2 V cut-off, a rest time of 30 minutes was allowed at room temperature, and then discharging was performed at 0.2 C and 2.75 V cut-off. The swelling characteristic of the battery was evaluated by determining a change in the thickness of the battery before and after the charge-discharge cycle.

Table 1 shows performance evaluation results of the lithium secondary batteries manufactured in Examples 1–2 and Comparative Example, including the swelling characteristic, the standard capacity, the high-rate characteristic, the life characteristic and the overcharge characteristic.

TABLE 1

| | Swelling (mm) | Standard capacity (mAh) | High-rate characteristic (mAh) | Life characteristic (%) | Overcharge characteristic (1 C, 12 V) |
|---|---|---|---|---|---|
| Example 1 | 6.12 | 960 | 940 | 85 | L0 |
| Example 2 | 6.10 | 965 | 942 | 83 | L0 |
| Comparative Example | 6.52 | 920 | 890 | 60 | L4 |

It was confirmed from Table 1 that the lithium secondary batteries prepared in Examples 1 and 2 exhibited improved performance compared to the battery prepared in Comparative Example 1, in view of the swelling, the standard capacity, the high-rate, the life and the overcharge characteristics.

The swelling, the standard capacity, the high-rate, the life and the overcharge characteristics of the lithium secondary battery prepared in Example 3 were substantially the same as such characteristics of the lithium secondary battery prepared in Example 1.

Figure 2:
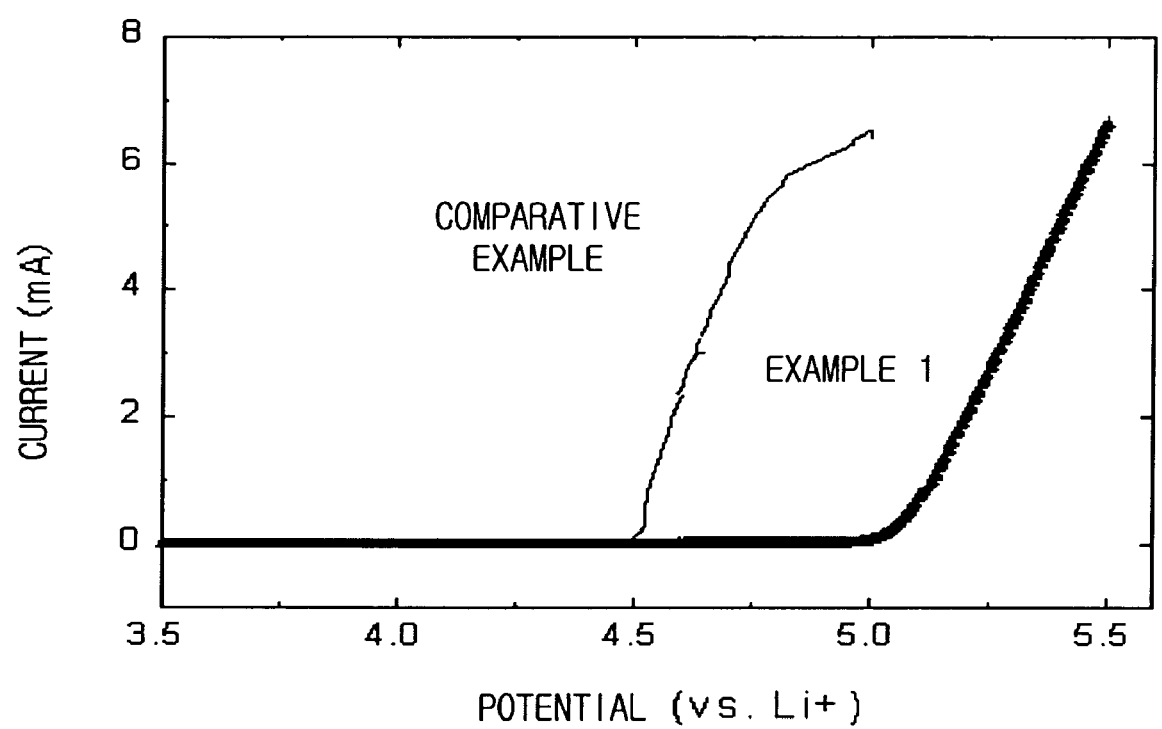
FIG. 2 is a graph showing an oxidative decomposition potential in lithium secondary batteries according to Example 1 of the present invention and Comparative Example.
Figure 3:
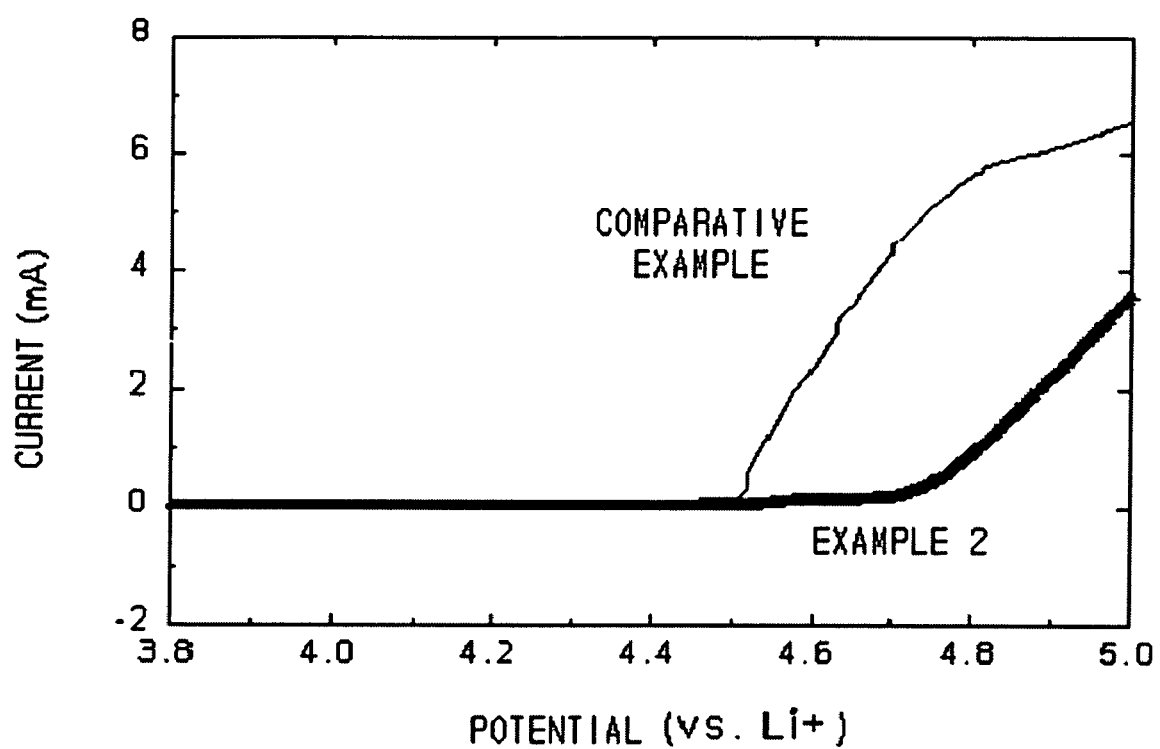
FIG. 3 is a graph showing an oxidative decomposition potential in lithium secondary batteries according to Example 2 of the present invention and Comparative Example.

In the lithium secondary batteries prepared in Examples 1–2 and Comparative Example, the oxidative decomposition potentials thereof were measured, and the results are shown in FIGS. 2 and 3.

Referring to FIG. 2, in the lithium secondary battery prepared in the Comparative Example, polymerization was initiated at approximately 4.5 V.

On the other hand, in the lithium secondary battery prepared in Example 1, oxidative polymerization took place at approximately 5.0 V. In the lithium secondary battery prepared in Example 2, oxidative polymerization also took place at a potential higher than the case of Comparative Example, that is, approximately 4.7 V. That is to say, it was confirmed that little oxidative decomposition occurred in the battery operating range.

As described above, the use of a nonaqueous electrolytic solution according to embodiments of the present invention causes formation of a polymer by oxidative decomposition of the electrolytic solution even if a sharp voltage increase occurs due to overcharging of a battery, leading to consumption of an overcharge current, thus protecting the battery. Thus, the safety of the battery during overcharging is improved and swelling may be effectively suppressed. Also, a lithium battery having effective performance, including a standard capacity, a high-rate characteristic and a life characteristic, may be manufactured.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A nonaqueous electrolytic solution comprising:
a lithium salt;
an organic solvent; and
a halogenated benzene compound represented by Formula 1:

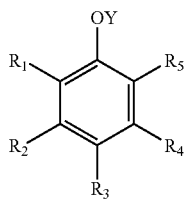

Formula 1 wherein Y is a C1 to C20 halogenated alkyl group, and $R_1$, $R_2$, $R_3$, R4 and $R_5$ are independently a hydrogen or halogen atom.

2. The nonaqueous electrolytic solution of claim 1, wherein Y is selected from the group consisting of —$CF_3$, —$CH_2Cl$, —$CH_2F$, —$C_2F_5$, —$CCl_3$ and —$C_2Cl_5$.

3. The nonaqueous electrolytic solution of claim 1, wherein Y is —$CF_3$, and $R_1$, $R_2$, $R_3$, $R_4$ and $R_5$ are each a hydrogen atom.

4. The nonaqueous electrolytic solution of claim 1, wherein Y is —$CH_2Cl$, $R_1$, $R_2$, $R_4$ and $R_5$ are each a hydrogen atom, and $R_3$ is Cl.

5. The nonaqueous electrolytic solution of claim 1, wherein the content of the halogenated benzene compound represented by Formula 1 is approximately 0.1 to 50 parts by weight, based on 100 parts by weight of the organic solvent.

6. The nonaqueous electrolytic solution of claim 1, further comprising approximately 0.1 to 50 parts by weight of polyester (meth)acrylate or a polymer of the polyester (meth)acrylate, based on 100 parts by weight of the organic solvent, wherein the polyester (meth)acrylate or a polymer of the polyester (meth)acrylate is a compound having a polyester polyol moiety having at least three hydroxide (—OH) groups, at least one hydroxide group being substituted by a (meth)acrylic ester group and at least one hydroxide group being substituted by a radical non-reactive group.

7. The nonaqueous electrolytic solution of claim 6, wherein the radical non-reactive group is selected from the group consisting of a C1 to C20 aliphatic hydrocarbon group, a C5 to C20 aromatic hydrocarbon group, a C1 to C20 ether group and a C1 to C20 ester group.

8. The nonaqueous electrolytic solution of claim 6, wherein the (meth)acrylic ester group is selected from the group consisting of —OC(=O)$R_n$OC(=O)CH=$CH_2$, —OC(=O)$R_n$OC(=O)C($CH_3$)=$CH_2$ and —O(C=O)$R_n$CH=$CH_2$ (n is an integer from 1 to 20), the radical non-reactive group is selected from the group consisting of —OC(=O)$R'_n$, —OC(=O)RmOR'n, and —O(C=O)$R_m$OC(=O)$R'_n$ where m and n are independently an integer from 1 to 20, R is selected from the group consisting of an optionally halogenated alkylene group, an optionally halogenated arylene group, an optionally halogenated alkylarylene group and an optionally halogenated aralkylene group, R' is selected from the group consisting of an optionally halogenated alkyl group, an optionally halogenated aryl group, an optionally halogenated alkylaryl group and an optionally halogenated aralkyl group.

9. The nonaqueous electrolytic solution of claim 6, wherein the molar ratio of the (meth)acrylic ester to the radical non-reactive group ranges from approximately 1:0.01 to approximately 1:100.

10. The nonaqueous electrolytic solution of claim 6, further comprising 0.3 to 5 parts by weight of organic peroxide per 100 parts by weight of the polyester (meth)acrylate or a polymer of the polyester (meth)acrylate.

11. The nonaqueous electrolytic solution of claim 10, wherein the organic peroxide is at least one selected from the group consisting of isobutyl peroxide, lauroyl peroxide, benzoyl peroxide, m-toluoyl peroxide, t-butyl peroxy-2-ethylhexanoate, t-butylperoxybivalerate, t-butyloxyneodecanate, diisopropyl peroxy dicarbonate, diethoxy peroxy dicarbonate, bis(4-t-butylcyclohexyl)peroxydicarbonate, dimethoxy isopropyl peroxy dicarbonate, dicyclohexylperoxy dicarbonate and 3,3,5-trimethylhexanoyl peroxide.

12. The nonaqueous electrolytic solution of claim 6, wherein the polyester polyol is at least one trialkylol selected from the group consisting of trimethylol, triethylol and tripropylol, glycerols, and at least one erythritol selected from the group consisting of pentaerythritol and dipentaerythritol.

13. The nonaqueous electrolytic solution of claim 6, further comprising at least one selected from the group consisting of methyl sulfone, vinyl sulfone, phenyl sulfone, benzyl sulfone, tetramethylene sulfone and butadiene sulfone, and an amount of a sulfone compound is in a range of 0.1 to 10 parts by weight per 100 parts by weight of the organic solvent.

14. A lithium battery comprising:
a cathode;
an anode; and
the nonaqueous electrolytic solution of claim 1.

15. The lithium battery of claim 14, wherein a separator made of an insulating resin is interposed between the cathode and the anode.

16. The lithium battery of claim 14, wherein the separator comprises one of:
polyethylene, polypropylene and a combination thereof.

17. The lithium battery claim 14, wherein
the lithium salt is $LiPF_6$;
the organic solvent is ethylene carbonate/ethylmethyl carbonate/propylene carbonate/fluorobenzene mixed solvent mixed in a predetermined weight ratio; and
the halogenated benzene compound is
the compound represented by Formula 1, wherein Y is $CF_3$ and $R_1$, $R_2$, $R_3$, $R_4$ and $R_5$ are each a hydrogen atom.

18. The lithium battery of claim 14, wherein,
the lithium salt is $LiPF_6$;
the organic solvent is a ethylene carbonate/ethylmethyl carbonate/propylene carbonate/fluorobenzene mixed solvent mixed in a predetermined weight ratio; and
the halogenated benzene compound is the compound represented by Formula 1, wherein Y is —$CH_2Cl$, $R_1$, $R_2$, $R_4$ and $R_5$ are each a hydrogen atom, and $R_3$ is Cl.

* * * * *

UNITED STATES PATENT AND TRADEMARK OFFICE
CERTIFICATE OF CORRECTION

PATENT NO. : 7,105,250 B2 Page 1 of 1
APPLICATION NO. : 10/637554
DATED : September 12, 2006
INVENTOR(S) : Jun-Ho Kim et al.

It is certified that error appears in the above-identified patent and that said Letters Patent is hereby corrected as shown below:

Column 14, line 41, insert -- of -- after "battery"

Signed and Sealed this

Sixth Day of February, 2007

JON W. DUDAS
*Director of the United States Patent and Trademark Office*